(12) United States Patent
Sherony (10) Patent No.: US 10,315,648 B2
(45) Date of Patent: Jun. 11, 2019

(54) PERSONALIZED ACTIVE SAFETY SYSTEMS

(71) Applicant: Toyota Motor Engineering & Manufacturing North America, Inc., Erlanger, KY (US)

(72) Inventor: Rini Sherony, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 152 days.

(21) Appl. No.: 15/455,610

(22) Filed: Mar. 10, 2017

(65) Prior Publication Data

US 2018/0257642 A1 Sep. 13, 2018

(51) Int. Cl.
| | |
|---|---|
| *B60W 30/08* | (2012.01) |
| *B60W 30/12* | (2006.01) |
| *B60W 10/18* | (2012.01) |
| *B60W 40/09* | (2012.01) |
| *B60W 50/10* | (2012.01) |
| *B60W 50/14* | (2012.01) |
| *B60W 10/30* | (2006.01) |

(52) U.S. Cl.
CPC ............ *B60W 30/08* (2013.01); *B60W 10/18* (2013.01); *B60W 10/30* (2013.01); *B60W 30/12* (2013.01); *B60W 40/09* (2013.01); *B60W 50/10* (2013.01); *B60W 50/14* (2013.01); *B60W 2050/146* (2013.01); *B60W 2420/40* (2013.01); *B60W 2420/42* (2013.01); *B60W 2420/52* (2013.01); *B60W 2510/06* (2013.01); *B60W 2540/30* (2013.01); *B60W 2710/18* (2013.01); *B60W 2750/40* (2013.01)

(58) Field of Classification Search
CPC ...... B60W 10/18; B60W 10/30; B60W 30/12; B60W 40/09; B60W 50/10; B60W 2050/146; B60W 2420/40; B60W 2420/42; B60W 2420/52; B60W 2510/06; B60W 2540/30; B60W 2710/18; B60W 2750/40
See application file for complete search history.

(56) References Cited

U.S. PATENT DOCUMENTS

| | | |
|---|---|---|
| 6,430,488 B1 | 8/2002 | Goldman et al. |
| 7,170,400 B2 | 1/2007 | Cowelchuk et al. |
| 7,864,029 B2 * | 1/2011 | Huang .................... B60R 25/04 340/426.1 |

(Continued)

*Primary Examiner* — Calvin Cheung
(74) *Attorney, Agent, or Firm* — Dinsmore & Shohl LLP (57) ABSTRACT

An assembly for changing at least one safety feature predefined setting associated with at least one vehicular active safety system includes a computer and a human-machine interface. The computer is configured to change the at least one safety feature predefined setting based on a driver choice. The at least one safety feature predefined setting is selected from the group consisting of a response type and a response timing. The human-machine interface includes an output and an input. The output is configured to provide a driver with a range of customizable settings for the at least one safety feature predefined setting. The input is configured to accept at least one customizable setting chosen by the driver such that the at least one safety feature predefined setting is changed to the at least one customizable setting.

20 Claims, 4 Drawing Sheets

(56) References Cited

U.S. PATENT DOCUMENTS

| | | | | |
|---|---|---|---|---|
| 8,135,511 | B2 * | 3/2012 | Demirdjian | B60R 21/015 |
| | | | | 701/36 |
| 8,965,621 | B1 | 2/2015 | Urmson et al. | |
| 9,134,955 | B2 | 9/2015 | Healey et al. | |
| 9,248,794 | B2 | 2/2016 | Chang et al. | |
| 9,248,819 | B1 | 2/2016 | Tan | |
| 9,308,879 | B2 | 4/2016 | Wright et al. | |
| 2011/0098893 | A1 * | 4/2011 | Hashimoto | B60N 2/0276 |
| | | | | 701/46 |
| 2016/0046232 | A1 * | 2/2016 | Guy | B60Q 1/525 |
| | | | | 340/436 |
| 2016/0150070 | A1 * | 5/2016 | Goren | H04W 4/029 |
| | | | | 455/404.2 |
| 2017/0120804 | A1 * | 5/2017 | Kentley | G05D 1/0088 |

* cited by examiner

PERSONALIZED ACTIVE SAFETY SYSTEMS

TECHNICAL FIELD

The present specification relates generally to vehicular safety systems, and more particularly to an assembly and associated methods that can provide a level of customization for such safety systems such that a driver may adjust one or both of the type and timing of a driver-recognizable response that such systems provide during a safety event.

BACKGROUND

It is known that vehicles have active safety systems such as lane departure warning systems, forward and rearward collision warning systems, automatic braking systems or the like. These active safety systems—which help to identify and, if necessary, avoid safety events—respond to sensed situations within a vehicle's operating environment by having one or more of its guidance components (such as the steering wheel, brakes or the like) cooperate with a controller to automatically adjust the function of such guidance components through braking assist, traction control, anti-lock braking, vehicle stability control, pre-collision braking or the like. Unfortunately, all of these systems have predefined response settings which cannot be customized in the manner used in driver convenience systems such as seat position, mirror position, brake and accelerator pedal position, steering wheel position or the like.

It is also known that within the realm of autonomous vehicles, sensor-based data can be used to derive driver-specific driving patterns, which along with driver-input user identification data, can be used to provide some limited range of operational control of the vehicle. Such customized vehicular control is only within the confines of one or more so-called safe envelope driving patterns, some of which appear to be based on predetermined (i.e., default) settings that are applicable to all drivers. The safe envelope driving patterns may be one or more sets of adjustable parameters limiting how a vehicle should be operated, for example, by controlling features such as the speed of changing lanes and the pattern of passing by vehicles, or the like. These systems are unique to autonomous vehicle operation, and as such do not permit an individual driver to customize system response for a vehicle that remains under operational control of the individual driver.

The author of the present disclosure has determined that it is desirable to have active safety systems with response settings that can be adjusted by each individual driver so that such systems respond to a safety event associated with the operation of the vehicle in a way most suitable to the driver, yet still permit the driver a wide range of control over the vehicle during normal vehicle operation.

SUMMARY

In one embodiment, an assembly for the adjustment of at least one vehicular safety system is disclosed. The assembly includes a computer and a human-machine interface (HMI). The computer adjusts one or more safety feature predefined settings based on a driver preference. Such settings may include one or both of safety feature response type and safety feature response timing. The HMI is disposed within a vehicle and cooperative with the computer to facilitate interaction between the driver and the system. The HMI includes an input and an output where the latter provides a driver with a range of customizable settings for the one or more safety feature predefined settings, while the former accepts a driver preference for the one or more customizable settings. In this way, the safety feature predefined setting is changed to the customizable setting. The system is further configured such that driver operational control over a vehicle equipped with the system is maintained during periods under both predefined safety feature setting conditions and customizable setting conditions. Such operational control is to be distinguished from autonomous or automated driving vehicles where the vehicle is capable of not only sensing its environment, but also navigating to a destination without the need for driver input.

In another embodiment, a vehicle is disclosed. The vehicle includes a platform made up of a wheeled chassis that is propelled by an engine that is coupled to a guidance apparatus cooperative with the wheeled chassis and the engine in order to provide motive control. The vehicle also includes one or more safety systems, as well as an assembly that includes a computer and an HMI such that driver operational control over the vehicle equipped with the assembly and systems is maintained during periods where both the predefined safety feature setting conditions and customizable setting preference conditions are being used by the system to monitor one or more safety events.

In yet another embodiment, a method of adjusting an active safety system for a vehicle is disclosed. The method includes providing a plurality of sensors on a vehicle that is equipped with at least one safety system to provide control over at least one of the vehicle's brakes, steering and acceleration, the sensors used to monitor such safety system or systems. In addition, an assembly made up of a computer and an HMI is provided such that the sensors, computer and HMI are signally cooperative with one another to monitor a safety event associated with the at least one safety system. The method further includes ascertaining with the HMI whether a driver is desirous of changing a safety feature predefined setting selected from the group consisting of a response type and response timing to a driver customizable setting and, if the driver indicates a desire to perform such changing through input to the HMI, using at least one of the HMI and the computer to change the safety feature predefined setting to the driver customizable setting. Significantly, even with the operation of the assembly discussed herein along with the one or more safety systems, driver operational control over the vehicle is maintained during periods under both predefined safety feature setting conditions and customizable setting conditions.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include providing a level of active safety system customization, permitting a driver to select one or both of the type and timing of a response that he or she would like for the various safety systems. In particular, the vehicle will have several predefined settings for each type of safety system, while the type of response may be a warning or a change in a response setting. Examples of response warnings may include the warning timing, the warning method (for example, audio, visual, haptic or a combination) or the like, while examples of response settings may include the activation timing associated with deploying one or more devices as a way to avoid or reduce the effects of a safety event. Additionally, the warning method can have additional customizable features including the audio or visual content of such warnings. Once a driver sets up a profile, it is stored in memory along with other settings (examples of which may include ergonomic-based customizable features such as seat position, mirror position or the like) such that when the driver enters the vehicle, he or she can select a respective memory button and have the safety settings automatically adjusted as a customizable feature. In one particular example, the vehicle can monitor the driver's driving habits for a duration and then provide recommended settings based on the driver's driving habits. For example, the vehicle may recommend different settings based on how aggressively or how passively the driver operates the vehicle. These recommended settings can be selected or modified by the driver in setting up his or her profile.

Figure 1:
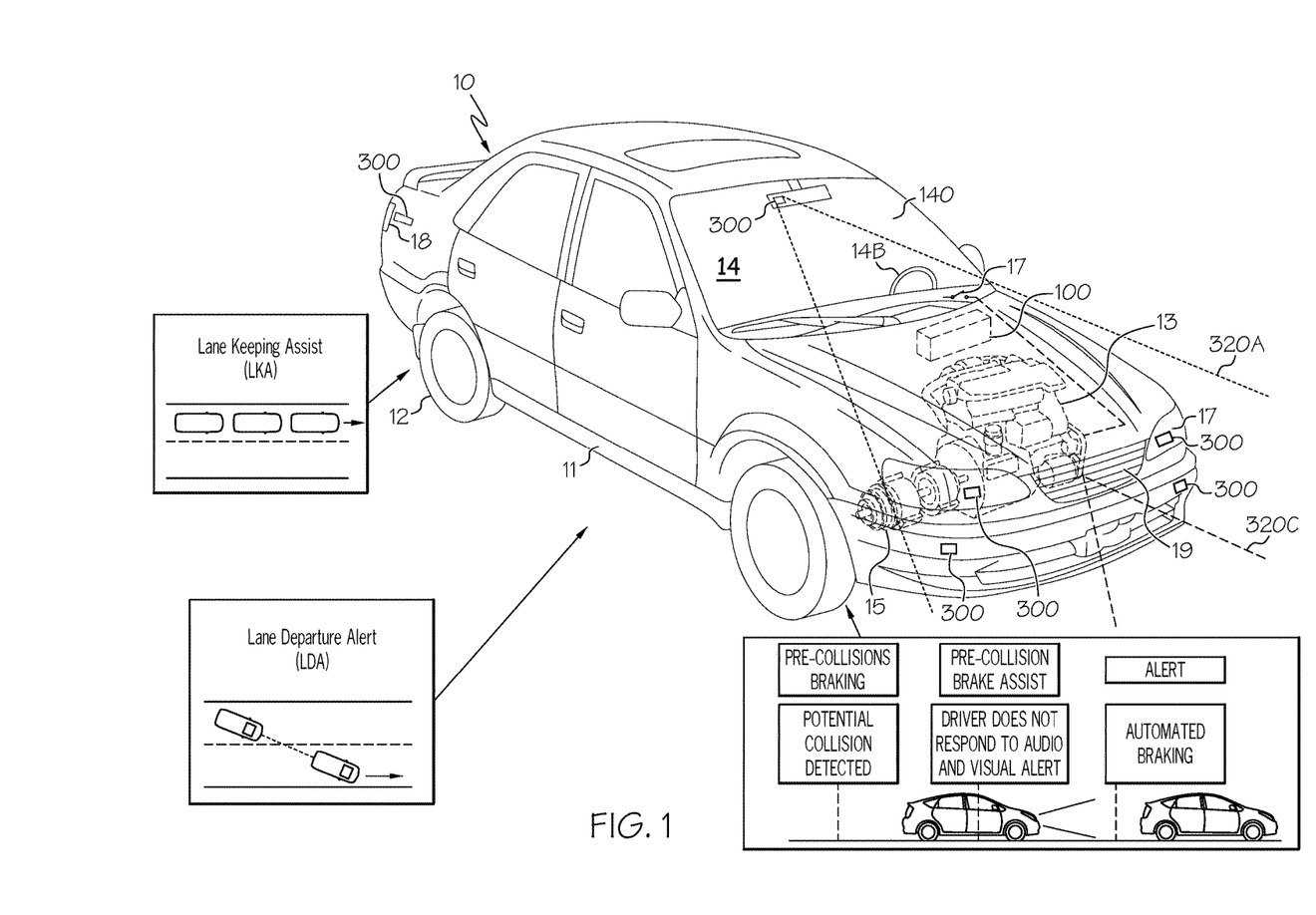
FIG. 1 depicts a notional vehicle that is equipped with an assembly for the personalization or customization of an active safety system in accordance with one or more embodiments shown or described herein.

Referring first to FIG. 1, a vehicle 10 is shown. Vehicle 10 includes a chassis 11 with a plurality of wheels 12. Chassis 11 may either be of body-on-frame or unibody construction, and both configurations are deemed to be within the scope of the present disclosure. A motive power unit 13 such as a conventional internal combustion engine (ICE), battery pack, fuel cell stack or a hybrid combination of one or more of the above may be situated in or on the chassis 11 to provide propulsive power to the vehicle 10. As shown, the motive power unit 13 is situated underneath a hood that is placed at the fore end of vehicle 10. A passenger compartment 14 is formed inside the chassis 11 and serves not only as a place to transport passengers and cargo, but also as a place from which a driver may operate vehicle 10. A transmission 15 is coupled to the motive power unit 13 such that together they form a drivetrain through which a torque may be applied to some or all of the wheels 12. A guidance apparatus (which may include, among other things, steering wheel, accelerator, brakes or the like, as well as the motors, pumps, fluids, actuators and ancillary structure needed to provide the corresponding functional attributes) is used in cooperation with the wheels 12, motive power unit 13, transmission 15 and other systems to control movement of the vehicle 10. Headlights 17 and brake lights 18, the latter of which may include a center high mount stop lamp (CHMSL, not shown), are mounted at the front and rear respectively of vehicle 10, the headlights laterally disposed relative to a grille 19.

It will be appreciated that the brakes may include intermittent operational features (such as pulsed operation, varied applied force or the like) to permit adjustment in the function of corresponding systems such as anti-lock braking or the like. Likewise, it will be appreciated that such adjustment may be achieved through selective advancement or retardation of the wheels through changes in differential operation or power delivery from the motive power unit 13 as used in vehicle stability control, traction control or the like. It will further be appreciated that some or all of these steering, braking or wheel advancement/retardation actions may be computer controlled as discussed below.

Figure 3:
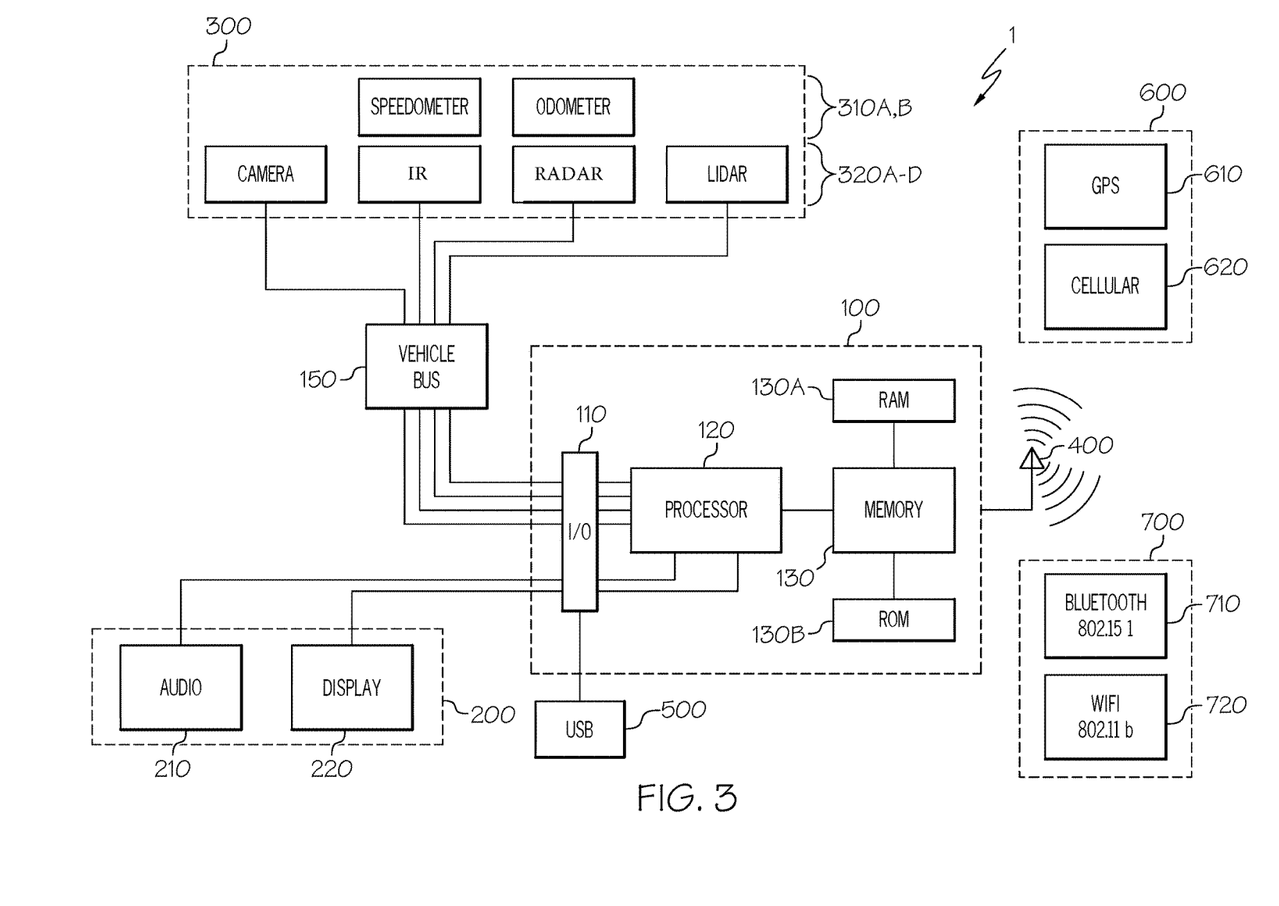
FIG. 3 depicts a block diagram depicting some of the functional units within an assembly for the adjustment of one or more active safety systems in accordance with one or more embodiments shown or described herein.

Referring to FIG. 3, vehicle 10 is equipped with an assembly 1 that can be used to personalize one or more active safety systems as will be discussed in more detail below. Briefly, assembly 1 includes a computer 100, a human-machine interface (HMI) 200, numerous vehicle-mounted sensors 300, one or more antennas 400, all connected through a bus 150. In addition, communications may be achieved between assembly 1 and one or more wired devices (such as through universal serial bus (USB) 500) and one or more devices accessible via wireless networks (e.g., far-field wireless networks 600 and local wireless networks 700). In some embodiments, numerous sensors 300 are placed around the exterior of vehicle 10. Control of electrical signals to or from the sensors 300, as well as to and from various other electrical-based components and systems of vehicle 10, may be provided by computer 100 which in one form may be configured as one or more electronic control units (ECUs) or related controllers. In one form, the assembly 1 will be understood to operate not only on the active safety systems, but also on one or more other devices within vehicle 10, including generally those shown in FIG. 1 or mentioned above, and particularly to one or more components or devices within the guidance apparatus, while in another form, the assembly 1 will be understood to include these same one or more devices within vehicle 10; either variant is deemed to be within the scope of the present disclosure. In this way, the active safety system or systems are cooperative with the guidance apparatus to provide control over at least one of the vehicle's brakes, steering, acceleration or other components used to operate the vehicle 10.

It will be appreciated by those skilled in the art that boundaries between various components and their respective operations are somewhat arbitrary, and that various structural arrangements are within the scope of the present disclosure so long as the function of both the active safety systems and the assembly 1 used to provide personalized control over the responses that are communicated by the active safety systems to the driver is preserved. For example, the lines of demarcation or overlap between the guidance apparatus and the components (such as the aforementioned steering wheel, accelerator, brakes and their corresponding ancillary structure) that make up the various safety systems may be blurred depending on the degree of structural integration between them. Likewise, the structure or components making up each of these safety systems is deemed to be intertwined with their associated function when construed as part of an active whole. Thus, within the present context, for a safety system made up of various steering, braking or related speed/acceleration control, there are corresponding functions associated with one or more of adaptive cruise control, lane keeping assist, adaptive (i.e., rotatable) headlights, night vision, navigation coordination, blind spot monitor, lane departure alert, adaptive/automatic high beam headlights, cooperative vehicle-to-vehicle (V2V), vehicle-to-pedestrian (V2P) or vehicle-to-infrastructure (V2I) communication, brake assist, anti-lock braking, traction control, vehicle stability control, collision warning, collision avoidance (preferably in conjunction with one or both of pre-collision automated braking and pre-collision automated steering) or related activities, as well as those for one or both of passenger and pedestrian protection. This present list is deemed to be representative and not exhaustive, as it will be appreciated that combinations of the above are also contemplated, as are structural-functional combinations among the safety systems that are conducive to the active control discussed herein.

In a similar way, the various sensors 300 discussed herein may in one form be made up of a sensor subsystem with supporting circuitry and control, while in another form, those same sensors 300 may make up a dedicated part of the safety system (i.e., steering, braking, acceleration or the like) to which they are signally connected. Furthermore, computer 100 may be configured to provide control not only over the assembly 1, but also over the various safety systems discussed herein; by having such computer 100 control, the safety systems become active in that rather than merely waiting for input from the driver, they—in response to computer 100 control—can take corrective actions without having to wait for such driver input. Thus, in one form, the computer 100 may be configured as either one central ECU or related controller for both active safety system control and assembly 1 control, or as numerous distributed ECUs each dedicated to their respective system or assembly 1; either variant is deemed to be within the scope of the present disclosure.

Figure 2:
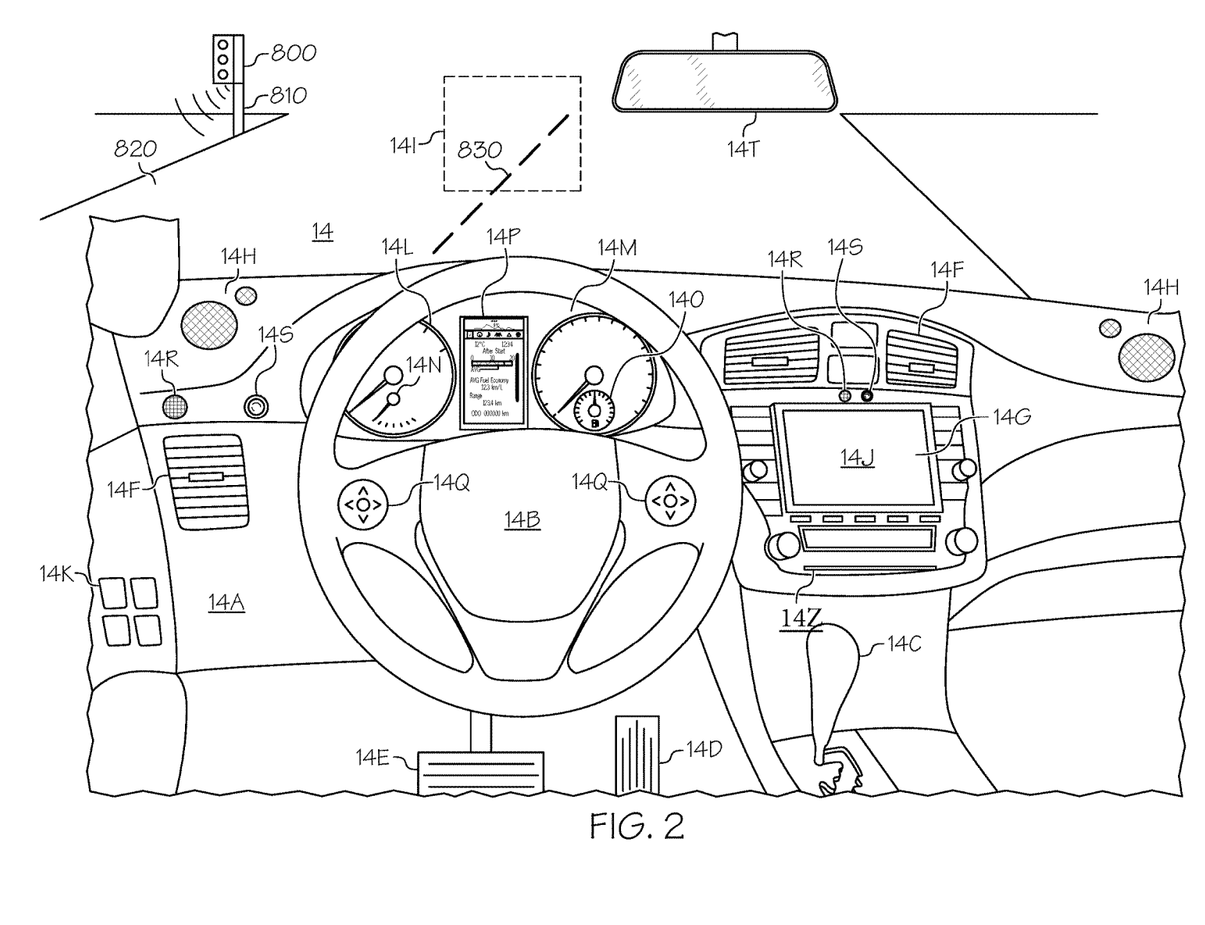
FIG. 2 depicts a driver's view of a dashboard within a vehicular passenger of the vehicle of FIG. 1.

Referring next to FIG. 2, the driver's portion of the passenger compartment 14 is shown where a dashboard 14A with various controls are placed at the driver's disposal in order to selectively operate the vehicle 10; such controls may include a steering wheel 14B, gear selector 14C, accelerator pedal 14D and brake 14E. Additional knobs, dials, buttons, switches and other means may be spaced around the dashboard 14A to control other systems, such as heating, ventilation and air conditioning (HVAC, of which only outlets 14F are shown), infotainment system 14G along with audio speakers 14H and displays 14I (which is shown presently as a head-up display (HUD)) and 14J and toggle switches 14K (such as for window control, door locks, mirror adjustment or the like). By way of example, the infotainment system 14G can be centrally located within the passenger compartment 14 such that its display 14J provides television-like images of regions in or around the vehicle 10 that are either within visual range of the various cameras, IR, radar or lidar imagers that make up some of the sensors 300, as well as—when in navigation mode—simulated routes, maps, places of interest or other terrestrial information as provided by a GPS system. In addition, display 14J can be made to show a clock, compass, radio station list, as well as various other messages commonly associated with vehicular telematics. Media input/output (shown presently as a CD or DVD slot 14Z (may also be included to facilitate the loading of data or other information to either the infotainment system 14G or the computer 100. As will be discussed in more detail below, the infotainment system 14G may form the head unit such that information and other interaction between the driver and the assembly 1 is achieved primarily (or in some cases, exclusively) through the infotainment system 14G. In such case, the infotainment system 14G may also include (or be the functional equivalent of) the HMI 200 that is discussed herein and shown in more detail below.

Likewise, various displays, gauges and audio devices may be used to convey information to the driver. Such may include a speedometer 14M, tachometer 14L, coolant temperature 14N, fuel gauge 14O or the like. A multi-information display (MID) 14P may be disposed between the tachometer and speedometer, and may visually represent various vehicular systems by screen-based graphical-user interface (GUI) icons that provide the driver with menu-driven visual information pertaining to one or more vehicular systems. In one form, MID 14P may be controlled by one or more four-way switches 14Q. In one form, the infotainment system 14G may receive inputs from other vehicle sensors or subsystems as further described below. Such input may be in the form of a microphone 14R or related acoustic-to-electric transducer to receive and convert voice signals into an equivalent analog or digital signal. Likewise, one or more cameras 14S may additionally be spaced in various locations on dashboard 14A in order to acquire visual data from the passenger compartment 14 in general and the driver in particular. A rearview mirror 14T (also shown in FIG. 1) may be used to provide an aft view of the vehicle 10, as well as house one or more of sensors 300 (such as a radar transmitter/receiver and a stereo camera, both as will be discussed in more detail below).

Referring next to FIG. 3, a block diagram depicting some of the components that provide the functional attributes of the assembly 1 is shown. One benefit of the assembly 1 is its ability to be implemented in automated data processing equipment, such as that associated with the computer 100 or related information processing system. In such case, the automation may take place through control logic, program code or a related algorithm in the form of computer-executable (i.e., machine-readable) instructions that can be performed, run or otherwise conducted on the computer 100. Such computer-executable instructions may be written in any programming language, including machine language that may be directly executed by a processor as discussed below, assembly language, object-oriented programming (OOP) language, scripting languages, microcode or the like that may be compiled or assembled and stored on memory as discussed below. Alternatively, the machine readable instructions may be written in a hardware description language (HDL), such as logic implemented via either a field-programmable gate array (FPGA) configuration or an application-specific integrated circuit (ASIC), as well as their equivalents. As such, the methods described herein may be implemented in any conventional computer programming language, as pre-programmed hardware elements, or as a combination of hardware and software components.

As mentioned above, in one form, the computer 100 may be configured as one or more ECUs that may be placed in the vehicle 10. In situations where numerous such ECUs are present, they may be distributed throughout the vehicle at locations suitable to their intended function. Regardless of the form, the computer 100 may be configured to include one or more of an input and output (I/O) 110, a processing unit (often referred to as a central processing unit (CPU) or more generally as a processor) 120 and memory 130 the last of which can temporarily or permanently store such a code, program or algorithm such that the instructions contained in the code are operated upon by the processing unit 120 based on input data received by I/O 110 such that output data generated by the code and the processing unit 120 can be conveyed to another program or a user via I/O 110. It will be appreciated that instead of a single CPU, the processing unit 120 may be in the form of numerous distributed microprocessors or related processing means, and that either variant is deemed to be within the scope of the present disclosure as long as they are capable of executing the machine-readable versions of the control logic, program code or related algorithm. In one form, a data-containing portion of the memory—also associated with volatile working memory—is referred to as random access memory (RAM) 130A, while an instruction-containing portion of the memory—also associated with permanent or non-volatile memory—is referred to as read only memory (ROM) 130B. Thus, it will be appreciated by those skilled in the art that computer-executable instructions that embody the calculations discussed elsewhere in this disclosure can be placed within an appropriate location (such as the aforementioned memory 130) within computer 100 in order to achieve the objectives set forth in the present disclosure. In one form, the computer 100 may additionally include additional chipsets (not shown) for peripheral functions. In addition to the control logic, program code or related algorithm, memory 130 may be configured to store object detection logic, object recognition logic, as well as auditory message generation logic, all as understood by those skilled in the art.

Such a computer 100 as discussed herein is generally referred to as having a von Neumann architecture, and is configured to perform the specific steps outlined in this disclosure. Upon having the program code means loaded into memory 130 in general (and in one form into ROM 130B in particular), computer 100 becomes a specific-purpose machine configured to determine the assembly 1 customization parameters in a manner as described herein. As such, computer 100 becomes a particularly-adapted computer or computer-related data processing device that employs the salient features of such an architecture in order to perform at least some of the data acquisition, manipulation or related computational functions discussed herein. As shown, computer 100 depicts an autonomous (i.e., stand-alone) unit; as will be appreciated by those skilled in the art, in one form it may be the part of a larger network such as those encountered in cloud computing, where various computation, software, data access and storage services may reside in disparate physical locations. In one form (not shown), computer 100 need not be located on-board the vehicle 10, such as those configurations associated with cloud computing. Such a dissociation of the computational resources does not detract from such a computer 100 being within the scope of the present disclosure.

A bus 150 or related set of wires and associated circuitry forms a suitable data communication path that can act as a local interface or related interconnect for the I/O 110, processing unit 120 and memory 130, as well as any peripheral equipment in such a way as to permit the computer 100 to operate as an integrated whole. The bus 150 may be configured to include control, address and data features, and can be arranged in any conventional format, including controller area network (CAN), local interconnect network (LIN) and vehicle area network (VAN) and related variants. Likewise, a communication path formed by bus 150 may signally couple any number of components within the assembly 1 to one another, regardless of whether they operate in a distributed or stand-alone computing environment. In one form, other devices may be coupled to the I/O 110 (either through the bus 150 or directly, the latter as shown), while in another form, such devices may make up the I/O 110, depending on the degree of structural integration where with higher levels of such degree, component redundancy may be reduced or avoided.

HMI 200 may be configured to act as a vehicle console or related head unit within a passenger compartment of vehicle 10 so that driver input to and response output from (through one or both of audio 210 and video, the latter in the form of display 220) the computer 100 may be realized. In one form, as shown in FIG. 2, such input and output may be achieved generally by the infotainment system 14G along with audio speakers 14H, display 14J, microphone 14R and camera 14S. Thus, using the infotainment system 14G, the driver input may be used to complete tasks such as program preferences or settings, provide commands, and provide feedback to HMI 200. Although shown presently as part of the infotainment system 14G, HMI 200 and its input and output may take on any appropriate form, including—in addition to conventional tactile means such as keyboard, touchpad, mouse or touchscreen—voice-driven means such as that through the microphone 14R or related audio transducer. In addition, the HMI 200 may be part of (or work in conjunction with) a vehicular telematics system to send and receive outside source of data, such as that delivered over the internet through near-field communications (such as Bluetooth, WiFi or related mechanisms) or far-field communications (such as wireless cellular or satellite). All such variants are deemed to be within the scope of the present disclosure.

HMI 200 may include one or more computer-readable medium loaders (not shown, but which may be in the form of a drive for receiving magnetic or optical data storage mediums in the form of CDs, DVDs, USB port (including flash) or the like. These loaders may be used to introduce additional control logic or other data (for example, static map updates or the like) as a way to place data or program instructions from one computer-usable medium to memory 130 on computer 100. As with memory 130, these data storage devices may be configured as volatile or nonvolatile memory devices such that while physically separate, may also serve the memory 130 functions discussed herein. In one form, the memory 130 and any of the control logic, program code or a related algorithm in the form of computer-executable instructions that resides thereon is non-transitory in that it exists as tangible media rather than as a propagated signal per se.

The sensors (collectively 300 but individually as numbered below) include those used for operational monitoring of vehicle 10 systems and their components; such sensors may include those used to measure temperatures, pressures, electrical current, fluid levels or the like. For example, a speedometer sensor 310A may be coupled to speedometer 14M in order to measure the speed of vehicle 10, while an odometer sensor 310B may be coupled to an odometer in order to measure the distance that vehicle 10 travels.

Other sensors 300 may be used to acquire data for delivery to and use by assembly 1. These sensors may be placed at various places in and around the vehicle 10 as can be seen in FIG. 1. In one form, these sensors 300 may be placed in various peripheral locations to maximize the field-of-view, such as in the front and rear bumpers, mirrors, the grille, as well as outward-looking from the passenger compartment. As such, these other sensors 300 may be configured to detect radiation in any desirable wavelength band, such as the ultraviolet wavelength band, the near-ultraviolet wavelength band, the visible light wavelength band, as well as various infrared wavelength bands, including near-infrared, infrared or far-infrared band. In one form, these sensors 300 may interact with the computer 100 directly, while in another form, the interaction could be indirect. In either event, such interaction may also use other hardware, such as amplifiers, drivers, digital-to-analog converters, analog-to-digital converters or the like (none of which are shown).

For example, the image-capturing sensors may include one or more digital cameras 320A capable of acquiring still images or digital video images in the 400 to 700 nanometer range that corresponds to the visible spectrum. The digital cameras 320A act as image sensors that may be configured as a charge-coupled device (CCD) or a complementary metal-oxide-semiconductor (CMOS) capable of detecting optical radiation having wavelengths in the visual spectrum. Such one or more digital cameras 320A may be configured in any known resolution, such as standard definition (640 pixels by 480 pixels), high definition (1440 pixels by 1024 pixels, or 1280 pixels by 1024 pixels) or ultra high definition (3840 pixels by 2160 pixels), although other resolutions are also deemed to be within the scope of the present disclosure. Such one or more digital cameras 320A may be used for lane-departure warnings and related situational awareness notification, as well as in conjunction with one or more of the sensors 300 mentioned below. In one form, one or more digital cameras 320A may be set up in forward-looking pairs in order to perform stereo photography; such a configuration is particularly well-adapted to acquire lane-width and object proximity data. In another form, one or more digital cameras 320A may be set up as a forward-looking single lens device.

Likewise, the image-capturing sensors may be configured to detect optical radiation in wavelengths outside of the visual spectrum. For example, sensors 300 may include one or more infrared (IR) detectors 320B (also referred to as thermal imaging camera, thermographic camera or the like) where the wavelengths tend to be much longer than the 400 to 700 nanometer range of the visible spectrum, often into the micrometer range. In one form, the one or more IR detectors 320B may be used for night-vision applications based on either a gated or non-gated active system where the one or more IR detectors 320B or a separate antenna sends out the signal so that the one or more IR detectors 320B (which in one form may be configured as the aforementioned CCD camera) picks up the return radiation. The one or more IR detectors 320B may be in one form integrated into the headlights 70 of vehicle 10. In such case, the light being emitted from the headlight 70 (which can be filtered such that only the select IR wavelength gets projected onto an object in its field-of-view, after which the reflection may be captured by the one or more IR detectors 320B, after which it can be sent to computer 100 acting in its capacity as an ECU or the like for further processing and display on HMI 200).

Furthermore, the image-capturing sensors may be configured to emit and receive microwave radiation. For example, sensors may include one or more radar sensors 320C at known frequencies, such as millimeter-wave radar (roughly 30 to 300 GHz), K-band (roughly 18 to 27 GHz) or X-band (roughly 8 to 12 GHz), or the like. Such one or more radar sensors 320C may be especially useful for dynamic/adaptive cruise control. The one or more radar sensors 320C may be used in conjunction with cameras (such as one or more digital cameras 320A discussed above) to detect the presence of vehicle or other objects in front of vehicle 10, as well as for automated braking and related movement-control functions. When used in combination, the one or more radar sensors 320C and the one or more digital cameras 320A are well-adapted to detecting objects in the road as part of a collision-avoidance system.

In addition, the image-capturing sensors may be configured to emit and receive coherent optical radiation for circumstances where collimated beam precision and related lack of return signal estimation is desired. For example, sensors may include one or more lidar sensors 320D. In one form, the one or more lidar sensors 320D may be made as solid-state devices with few or no moving parts, including those configured as optical phased array devices where its prism-like operation permits a wide field-of-view without the weight and size complexities associated with traditional rotating lidar detectors. As with the one or more radar sensors 320C, the one or more lidar sensors 320D are particularly suited to measuring time-of-flight, which in turn can be correlated to distance measurements with objects that are within the one or more lidar sensors 320D field-of-view. As with the one or more IR detectors 320B, the one or more lidar sensors 320D may in one form be operated in or near the infrared range of the electromagnetic spectrum, with one example having emitted radiation of about 905 nanometers. Sensors such as the one or more lidar sensors 320D can be used by vehicle 10 to provide detailed 3D spatial information for the identification of objects near the vehicle 10, as well as the use of such information in the service of systems for vehicular mapping, navigation and autonomous operations, especially when used in conjunction with geo-referencing devices such as GPS 610 or a gyroscope-based inertial navigation unit (INU, not shown) or related dead-reckoning system, as well as memory (either its own or memory 130 of computer 100).

The sensors 300 may also include a microphone or related auditory device to capture sound. As with the other sensors discussed herein, the microphone may be configured as capable of receiving auditory signals from the processing unit 120 (either directly or indirectly from other hardware, such as amplifiers, drivers, digital-to-analog converts, and the like) to produce auditory messages capable of being heard by the driver 5. In one form, the acoustic signals being sensed may include sonar for clearance control.

The images or other data captured by the one or more digital cameras 320A, the one or more IR detectors 320B, the one or more radar sensors 320C or the one or more lidar sensors 320D are coupled to the computer 100 through the bus 150 so that control signals sent from the computer 100 can instruct the sensors 300 to acquire image data of an operating space around vehicle 10, and to send the acquired image data to the processing unit 120 or memory 130 for respective processing or storage. In one form, the acquired image data digitally represents objects within the scene; such objects may include other vehicles, landmarks, pedestrians, cyclists, animals, or the like. With particular regard to other vehicles, the one or more digital cameras 320A, the one or more IR detectors 320B, the one or more radar sensors 320C or the one or more lidar sensors 320D may be tuned to acquire relative movement information (such as through doppler/radar, lidar, optical or the like), as well as light-based imagery through IR, photodiode or optical means, where such light-based imagery may include whether a traffic light 800 is emitting red light, yellow light or green light.

It will be appreciated that coupling the sensors 300 to the computer 100 may be used as computer vision to form part of a vehicle navigation system when used in conjunction with GPS, odometry (such as inertial reference units and their associated deck reckoning capabilities) or the like in order to interpret sensory information to identify vehicle 10 surroundings, as well as formulate appropriate navigation paths, as well as identify obstacles, roadway signage or the like. In one form, the computer 100 is configured to automatically detect an object, such as through actively sending a signal and receiving a return signal through one or more of the sensors 300. In such case, the computer 100 may also be configured to automatically recognize the detected object (through shapes, colors or other indicia) with object recognition software loaded into memory 130.

One or more antennas 400 may be used to affect signal communication between assembly 1 and telecommunications networks such as far-field wireless networks 600 including one or more of satellite (for example, GPS 610) or cellular 620 configurations. In such circumstances, computer 100 includes navigation system functionality and telephone functionality in addition to other conventional radio-frequency communication functionality such as that associated with known telematics systems. In addition, such antenna or antennas may be used to affect near-field signal communication with local wireless networks 700 via wireless (such as Bluetooth 710 or related Wifi 720) in or around a vehicle, while a wired signal communication approach (such as USB 500) may also be used for on-board use. Within the present context, the term "signal" is meant to include a waveform (for example, in electrical, optical, magnetic, acoustic or electromagnetic form), and that such form may include direct current (DC), alternating current (AC), sinusoidal-wave, triangular-wave, square-wave, vibration and related variants all of which are capable of traveling through a suitable medium Likewise, the terms "signal communication", "signally coupled", "communicatively coupled" and their variants mean that coupled components are capable of exchanging data signals with one another where, for example, the data signals are electrical signals conveyed via conductive medium, electromagnetic signals conveyed over the air, optical signals conveyed over optical waveguides, or the like. In wired form, such conductive medium may include a combination of conductive traces, conductive wires, connectors, and buses that cooperate to permit the transmission of electrical data signals to and from the computer 100 and signally-coupled devices such as HMI 200, sensors 300 or the like. With particular regard for a signal arriving from the GPS 610, the signal received into the one or more antennas 400 is transformed into a data signal indicative of the triangulated location (latitude and longitude) of the vehicle 10, as well as vehicle 10 direction and speed. As mentioned above, such data signal may be operated upon by computer 100. In circumstances where the one or more antennas 400 collect signal data from an outside source such as GPS 610 or the cellular network 520, and further where the signal data is being used to provide navigation or related vehicular position information to vehicle 10, the one or more antennas 400 is understood within the present context to function as a sensor in a manner analogous to the sensors 300 discussed herein in that it acquires data for processing by computer 100. Although not shown, one or more network interface devices may be included to couple the assembly 1 to one or more remote networks through the one or more antennas 400. The navigation system may also provide additional information on the location of the vehicle 10. For example, use of the navigation system of vehicle 10 as part of the assembly 1 may additionally be beneficial in that it can provide the locations of traffic lights 800 and other traffic control devices (such as shown in conjunction with FIG. 2) that are noted in its database so that the confirmation of a traffic light 800 or other traffic control device can be directly acquired from the navigation system.

Referring again to FIG. 2 and regarding GPS 610, in one form, navigation-related data may be formed as a combination of a static database and a dynamic database, where the former includes geographical information pertaining to known or previously traveled segments and routes, while the latter includes temporal information pertaining to when particular routes or segments were traveled. In embodiments that include a static database, the static database generally includes a segment list and a route list, while in embodiments that include a dynamic database, such database generally includes a route history. In some embodiments that include a static database and a dynamic database, the static database and dynamic database are stored in XML format, though it will be appreciated that the static database and dynamic database may be stored in any other format. However, it will be understood that the use of a static-versus-dynamic database for the navigation-related data is not required.

Moreover, the communication between the GPS 610 and the assembly 1 may be achieved through the HMI 200 where video information in the form of maps or the like is shown on display 220 mounted in a passenger compartment of the vehicle 10. In addition to maps for depicting roadways and navigation patterns around the vehicle, such video information from the display 220 may also include that used for entertainment, information or a combination thereof. The display 220 may include any medium capable of transmitting an optical output such as, for example, light emitting diodes, a liquid crystal display, a plasma display a cathode ray tube or the like. As mentioned above, the display 220 may also be configured as a touchscreen that—in addition to providing optical information—detects the presence and location of a tactile input upon a surface of or adjacent to the display 220. In some embodiments, the display 220 and the touchscreen are combined as a single module within HMI 200, while in others, the touchscreen and its tactile input hardware may be separate from the display 220, GPS 610 and related navigational or map data; in either configuration, may exchange signals with one another through bus 150 or other suitable communication path. In another form, GPS 610 may communicate with the driver without the need for a display 220, and instead do so solely through the audio 210 portion of HMI 200. This is useful in embodiments in which the navigation system portion of computer 100 is used to predict a route based on one or both of turn determination and segment identification such that it automatically utilizes the predicted route to optimize a vehicle 10 operating parameter based on the predicted route.

It will be appreciated that assembly 1 may include additional components not illustrated in FIG. 1, such as a power source, voltage regulators, analog-to-digital converters, digital-to-analog converters, drivers, signal conditioning circuits, electromagnetic filtering circuits, and the like, and that insofar as any or all of these additional components and their functions are useful to ensure proper functionality of assembly 1, are deemed to be incorporated by reference as being within the scope of the present disclosure.

Referring to FIG. 1, in one form, the traffic light 800 may be configured as part of an intelligent transportation system (ITS) that uses dedicated short-range communications (DSRC) devices to provide wireless nodal V2I networks in which vehicles and traffic lights or other roadside units exchange information with one another to facilitate the smooth, safe flow of traffic. Beacons 810 or related transceivers can convey one or more signals to the sensors 300 or the one or more antennas 400 for subsequent on-board processing by computer 100. In one form, such beacons 810 may operate in a known frequency band (such as 700 MHz in one form) to detect oncoming vehicles, pedestrians and other objects that might be present at a traffic intersection or other possible point of congestion. Road 820 and lane markers 830 can additionally be used to identify certain spatial data that can then be used by the various on-board safety or navigation systems to provide information to the driver or other occupants of vehicle 10. The sensors 300 and the one or more antennas 400 may also be used as part of a V2V network (also referred to as a vehicular ad hoc network (VANET)) where each vehicle acts as a node that forms a part of a larger communication system that does not rely upon pre-existing communications infrastructure. One common DSRC communication channel for V2V in the United States operates at 5.9 GHz. Both V2V and V2I may in turn be understood to make up a portion of and ITS.

Figure 4A:
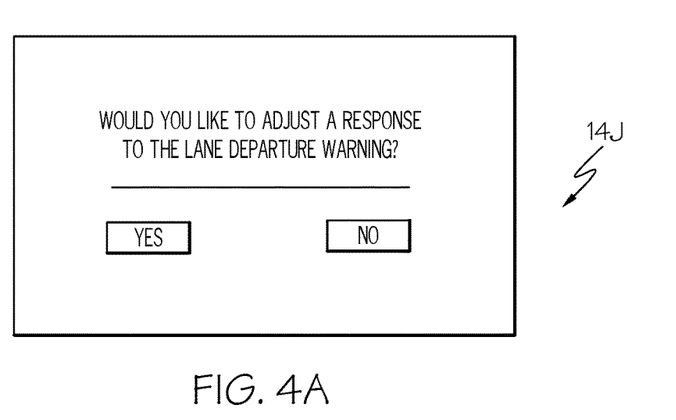
FIG. 4A depicts a first screen shown on a display in accordance with one or more embodiments shown or described herein.
Figure 4B:
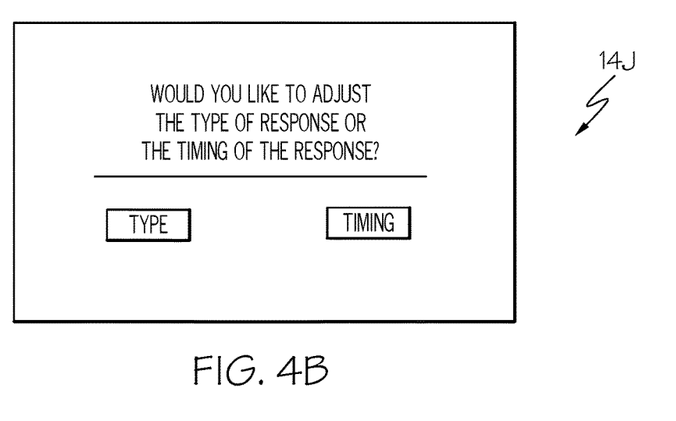
FIG. 4B depicts a second screen shown on a display in accordance with one or more embodiments shown or described herein.
Figure 4C:
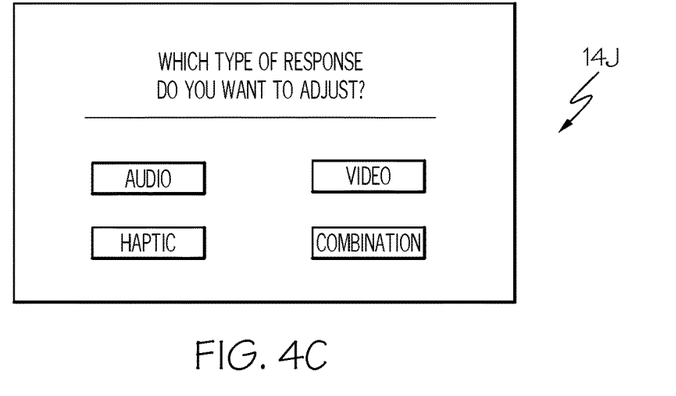
FIG. 4C depicts a third screen shown on a display in accordance with one or more embodiments shown or described herein.

Referring next to FIGS. 4A through 4C, screens formed on display 14J from FIG. 2 are used as an exemplary platform for the communication between HMI 200 and a driver (not shown). It will be appreciated that the information may be depicted on other displays as well, including HUD 14I and MID 14P, and that if such other variants are employed, they will be understood to form an extension of HMI 200. Regardless of which of displays 14I, 14J or 14P are used, they can all be made to provide such information in sequential or cascading menu-based formats, or any other format suitable to conveying information to the driver in an efficient, logical manner.

Initially as shown in FIG. 4A, the driver requests a change in one of the safety system predefined settings (in particular, the setting for the lane departure warning safety system, although it will be appreciated that this applies equally to the other safety systems and their functions such as the aforementioned adaptive cruise control, lane keeping assist, adaptive headlights, night vision, navigation coordination, blind spot monitor, lane departure alert, adaptive high beam headlights, cooperative V2V, vehicle-to-pedestrian (V2P) or V2I communication, brake assist, anti-lock braking, traction control, vehicle stability control, collision warning and collision avoidance).

Such a request from the driver can be verbal (through a suitable voice-recognition system using microphone 14R of FIG. 2) or tactile (such as keyboard, touchpad, mouse or touchscreen the last of which may include display 14J). When the driver decides to change from the predefined safety feature setting (such as by pressing on the "yes" image on display 14J), he or she is taken to another screen on display 14J as shown in FIG. 4B, where the driver is asked if it is (a) a type of response (for example, audio, visual, haptic or a combination) provided by the assembly 1 that needs changing, or (b) the timing of the response of the assembly 1 that needs changing. In one form, there may be limits to how promptly or how delayed the response timing may be, where such limits are set by exigencies of the safety event.

The driver chooses the suitable "type" or "timing" image, and is then routed to yet another screen on display 14J as shown in FIG. 4C. At this time, the driver selects from the choice of the previously-discussed "audio", "video", "haptic" or "combination" images so that a respective one or more responses may subsequently be displayed. For example, if the driver selects the "audio" option, then the assembly 1 will selectively energize one or more of the audio speakers 14H such that if a safety event is encountered that is associated with the lane departure warning safety system, the notification to the driver is presented through the HMI 200 in a manner consistent with the customized setting established by the driver.

Within the present context, the term "safety event" includes those situations during the operation of the vehicle 10 where a heightened degree of operational risk relative to so-called "normal" driving events is either imminent or actually experienced. Such heightened degree of operational risk can be something relatively benign, such as encountering a curve in the road during night-time driving (in which case an active safety system associated with adaptive headlights may be activated), to something where a greater degree of active intervention is required, such as an active system associated with collision-avoidance or damage-mitigation. By way of non-limiting examples, active safety systems that may have their response times or types include one or more of adaptive cruise control, lane keeping assist, adaptive (i.e., rotatable) headlights, night vision, navigation coordination, blind spot monitor, lane departure alert, adaptive/automatic high beam headlights, cooperative vehicle-to-vehicle, vehicle-to-pedestrian or vehicle-to-infrastructure communication, brake assist, anti-lock braking, traction control, vehicle stability control, collision warning, collision avoidance (preferably in conjunction with one or both of pre-collision automated braking and pre-collision automated steering), as well as those for passenger/pedestrian protection.

Likewise, the assembly 1 permits driver customization of the timing of the response (not shown) in a menu-driven manner where audio or video inputs may be made by the driver and processed by the computer 100 such that the assembly can personalize the rapidity or slowness (with the aforementioned ranges) with which such safety system information is presented to the driver. As discussed elsewhere, this is particularly valuable when done in conjunction with known driver profiles (such as stored in memory 130) based on for example, how passive or aggressive a particular driver's driving habits are. Examples of systems that can be used to ascertain driver habits may be seen in U.S. Pat. Nos. 7,317,406 and 9,242,639, both of which are owned by the assignee of the present disclosure and the contents of which are incorporated by reference in their entirety.

Significantly, the assembly 1 may be coupled with the measured or actual speed of vehicle 10 as part of monitoring traffic patterns in general and traffic situations in particular. In addition to vehicle 10 speed data, forward view and location information (as acquired by static maps, GPS 610 or the like) may also be used so that when the vehicle 10 comes to a stop, the assembly 1 will look for either a traffic light 800 or other traffic signal (not shown), or a stopped vehicle immediately in front of the vehicle 10. It is feasible that a vehicle stopped in front of the vehicle 10 is stopped at a traffic light 800 or other traffic control device, but that the vehicle 10 cannot detect the presence of such traffic control device due to the distance or obstruction between the former and the latter. In this case, the forward vision capability of the assembly 1 and its associated radar, lidar, IR or camera-based sensors may be made to look for evidence of a traffic situation from a vehicle in front of the vehicle 10, such as illuminated rear brake lamps, or a radar or lidar image representative of the forward vehicle. Likewise, the vehicle 10 may use these sensors 300 to ascertain vehicles, pedestrians, animals or other objects in front of the vehicle 10 that may give rise to the traffic situation. Vehicle 10 may also use a signal received from the GPS 610 or the speedometer sensor 310A and processed by computer 100 as a way to determine if the vehicle 10 has moved.

Likewise, the assembly 1 may be configured to recognize circumstances that fall outside of a traffic situation. In such case, the data being acquired by the sensors 300, when processed by the computer, may recognize that vehicle 10 is in a parking lot, private residence driveway or garage such that instead of alerting the driver as in step 1100, the assembly 1 goes into a logic loop or related holding pattern where it continues to monitor the vehicle 10 speed rather than start the driver-alerting timer. This circumstance may arise, for example, when the driver brings the vehicle 10 to a stop when there is a parked vehicle in front of the vehicle 10, such as pulling into a parking space. At this time, the assembly 1 will recognize that there are no illuminated rear brake lamps on the forward vehicle. Additional data (such as from the GPS 610) could also be used to help the assembly 1 to determine that the vehicle 10 is not in the vicinity of an intersection or traffic signal, which in turn can be used by the assembly 1 to indicate that vehicle 10 is not in the presence of a traffic situation. This latter circumstance (for example, if the driver is intentionally stopping in a parking lot, at a residence, or for some other reason) is useful in that it helps to ascertain whether the vehicle 10 is even in a situation where the driver should be monitored for distractions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the assembly and methods using the assembly may be implemented in one or both of software and hardware, and that all variations on the embodiments of such assembly and method as discussed herein will be understood to be within the scope of the present disclosure. Furthermore, the order of steps associated with such methods may be changed, while various features of the assembly may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assembly for changing at least one safety feature predefined setting associated with at least one vehicular active safety system, the assembly comprising:
   a computer configured to change the at least one safety feature predefined setting based on a driver choice, the at least one safety feature predefined setting including a response timing; and
   a human-machine interface disposed within a vehicle and cooperative with the computer and a plurality of sensors to monitor a safety event associated with the at least one vehicular active safety system, the human-machine interface comprising:
      an output configured to provide a driver with a range of customizable settings for the at least one safety feature predefined setting; and
      an input configured to accept at least one customizable setting chosen by the driver such that the at least one safety feature predefined setting is changed to the at least one customizable setting such that an amount of time taken to convey a response is selectively lengthened or shortened in a manner provided by the at least one customizable setting, the assembly configured such that driver operational control over the vehicle is maintained during periods under both predefined safety feature setting conditions and customizable setting conditions.

2. The assembly of claim 1, wherein the at least one safety feature predefined setting includes a response type comprising at least one of an audio response, a visual response, a haptic response and a combination thereof.

3. The assembly of claim 1, wherein wherein the response comprises at least one of an audio response, a visual response, a haptic response and a combination thereof.

4. The assembly of claim 1, wherein the computer is further configured such that driver habit data sensed by the plurality of sensors and processed by the computer forms a basis for a recommended setting within the range of customizable settings.

5. The assembly of claim 4, wherein the recommended setting is based on acquired data that is indicative of how aggressively the driver operates the vehicle.

6. The assembly of claim 1, wherein the computer is further configured such that driver habit data sensed by the plurality of sensors and processed by the computer forms a basis for a recommended setting within a range of the at least one safety feature predefined setting.

7. The assembly of claim 6, wherein the recommended setting is based on acquired data that is indicative of how aggressively the driver operates the vehicle.

8. The assembly of claim 1, wherein the at least one vehicular active safety system comprises at least one device configured to provide at least one of adaptive cruise control, lane keeping assist, adaptive headlights, night vision, navigation coordination, blind spot monitor, lane departure alert, adaptive high beam headlights, cooperative vehicle-to-vehicle, vehicle-to-pedestrian or vehicle-to-infrastructure communication, brake assist, anti-lock braking, traction control, vehicle stability control, collision warning and collision avoidance.

9. A vehicle comprising:
   a platform comprising a wheeled chassis defining a passenger compartment and an engine compartment comprising an engine disposed therein,
   a guidance apparatus cooperative with the wheeled chassis and the engine in order to provide motive control;
   a safety system cooperative with the guidance apparatus to provide control over at least one of vehicle brakes, vehicle steering and vehicle acceleration; and
   an assembly for changing at least one safety feature predefined setting associated with the safety system, the assembly comprising:
      a computer configured to change the at least one safety feature predefined setting based on a driver choice, the at least one safety feature predefined setting including a response timing; and
      a human-machine interface disposed within the vehicle and cooperative with the computer, the human-machine interface comprising:
         an output configured to provide a driver with a range of customizable settings for the at least one safety feature predefined setting; and an input configured to accept at least one customizable setting chosen by the driver such that the at least one safety feature predefined setting is changed to the at least one customizable setting such that an amount of time taken to convey a response is selectively lengthened or shortened in a manner provided by the at least one customizable setting, the assembly configured such that driver operational control over the vehicle is maintained during periods under both predefined safety feature setting conditions and customizable setting preference conditions.

10. The vehicle of claim 9, wherein the vehicle does not comprise an autonomous mode of operation.

11. The vehicle of claim 9, wherein the human-machine interface comprises one part of an infotainment system.

12. The vehicle of claim 9, further comprising a plurality of sensors configured to acquire data that provides indicia of an operation of the vehicle, the plurality of sensors signally cooperative with at least one of the computer, the human-machine interface and the safety system to monitor a safety event associated with the safety system.

13. The vehicle of claim 12, wherein the plurality of sensors comprise at least one of a camera, a radar, a lidar, an infrared detector and a combination thereof.

14. The vehicle of claim 9, wherein the safety system comprises at least one device configured to provide at least one of adaptive cruise control, lane keeping assist, adaptive headlights, night vision, navigation coordination, blind spot monitor, lane departure alert, adaptive high beam headlights, cooperative vehicle-to-vehicle, vehicle-to-pedestrian or vehicle-to-infrastructure communication, brake assist, anti-lock braking, traction control, vehicle stability control, collision warning and collision avoidance.

15. The vehicle of claim 9, wherein the at least one safety feature predefined setting includes a response type comprising at least one of an audio response, a visual response, a haptic response and a combination thereof.

16. The vehicle of claim 9, wherein the response comprises at least one of an audio response, a visual response, a haptic response and a combination thereof.

17. A method of changing a safety feature predefined setting associated with at least one safety system of a vehicle, the method comprising:
providing, on the vehicle that is equipped with the at least one safety system to provide control over at least one of vehicle brakes, vehicle steering and vehicle acceleration:
a plurality of sensors to monitor the at least one safety system; and
an assembly comprising a computer and a human-machine interface such that the plurality of sensors, computer and human-machine interface are signally cooperative with one another to monitor a safety event associated with the at least one safety system;
ascertaining with the human-machine interface whether a driver is desirous of changing the safety feature predefined setting to a driver customizable setting, the safety feature predefined setting selected from a group consisting of a response type and a response timing; and
using at least one of the human-machine interface and the computer to change the safety feature predefined setting to the driver customizable setting when the driver indicates a desire to perform such changing through input to the human-machine interface, wherein driver operational control over the vehicle is maintained during periods under both predefined safety feature setting conditions and customizable setting conditions.

18. The method of claim 17, wherein the plurality of sensors cooperates with the at least one safety system and the computer to provide indicia of at least one of adaptive cruise control, lane keeping assist, adaptive headlights, night vision, navigation coordination, blind spot monitor, lane departure alert, adaptive high beam headlights, cooperative vehicle-to-vehicle, vehicle-to-pedestrian or vehicle-to-infrastructure communication, brake assist, anti-lock braking, traction control, vehicle stability control, collision warning and collision avoidance.

19. The method of claim 17, further comprising:
sensing driver habit data acquired by the plurality of sensors;
processing the acquired driver habit data by the computer; and
providing to the driver a recommended setting that is within a range of the customizable setting conditions.

20. The method of claim 17, further comprising:
sensing driver habit data acquired by the plurality of sensors;
processing the acquired driver habit data by the computer; and
providing to the driver a recommended setting that is within a range of the predefined safety feature setting conditions.

* * * * *

UNITED STATES PATENT AND TRADEMARK OFFICE
CERTIFICATE OF CORRECTION

PATENT NO. : 10,315,648 B2
APPLICATION NO. : 15/455610
DATED : June 11, 2019
INVENTOR(S) : Rini Sherony Page 1 of 1

It is certified that error appears in the above-identified patent and that said Letters Patent is hereby corrected as shown below:

In Column 16, Line 17, Claim 3, delete "wherein wherein" and insert --wherein--, therefor.

Signed and Sealed this
Thirtieth Day of July, 2019

Andrei Iancu
*Director of the United States Patent and Trademark Office*